(12) United States Patent
Liao et al.

(10) Patent No.: US 7,925,314 B2
(45) Date of Patent: Apr. 12, 2011

(54) FOLDABLE ELECTRONIC DEVICE

(75) Inventors: Chun-Yi Liao, Taipei (TW); Yu-Chuan Chang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 440 days.

(21) Appl. No.: 12/183,052

(22) Filed: Jul. 30, 2008

(65) Prior Publication Data

US 2009/0048006 A1 Feb. 19, 2009

(30) Foreign Application Priority Data

Aug. 17, 2007 (TW) .............................. 96130463 A (51) Int. Cl.
  *H04M 1/00* (2006.01)
(52) U.S. Cl. .................. 455/575.1; 455/550.1; 455/90.3; 455/575.3; 379/330
(58) Field of Classification Search ............... 455/575.1, 455/550.1, 90.3, 575.3, 128, 347; 379/330, 379/428.01, 58, 61
  See application file for complete search history.

(56) References Cited

U.S. PATENT DOCUMENTS

| | | | | |
|---|---|---|---|---|
| 5,436,954 A * | 7/1995 | Nishiyama et al. | ........... | 455/566 |
| 5,508,709 A * | 4/1996 | Krenz et al. | ................... | 343/702 |
| 5,556,017 A * | 9/1996 | Troy | ............... | 224/549 |
| 5,732,135 A * | 3/1998 | Weadon et al. | .......... | 379/433.13 |
| 5,832,079 A * | 11/1998 | Rabe | ........................ | 379/433.13 |
| 6,104,621 A * | 8/2000 | Weadon et al. | ............... | 361/814 |
| 6,421,547 B1 * | 7/2002 | Frohlund et al. | ........... | 455/575.3 |
| 6,493,542 B1 * | 12/2002 | Frohlund | ..................... | 455/90.1 |
| 6,539,208 B1 * | 3/2003 | Mori | .......................... | 455/575.3 |
| 6,755,581 B1 * | 6/2004 | Huang et al. | .................. | 400/472 |
| 6,788,551 B2 * | 9/2004 | Takagi | ............................ | 361/814 |
| 6,839,225 B2 * | 1/2005 | Chou | ......................... | 361/679.2 |
| 6,961,593 B1 * | 11/2005 | Lonka et al. | .................. | 455/573 |
| 7,009,836 B2 | 3/2006 | Lo | | |
| 7,061,752 B1 * | 6/2006 | Lin et al. | .................. | 361/679.01 |
| 7,136,688 B2 * | 11/2006 | Jung et al. | .................. | 455/575.4 |
| 7,149,557 B2 * | 12/2006 | Chadha | ....................... | 455/575.1 |
| 7,242,973 B2 * | 7/2007 | Saitoh et al. | .............. | 455/575.1 |
| 7,256,987 B2 * | 8/2007 | Weng | ........................ | 361/679.55 |

(Continued)

FOREIGN PATENT DOCUMENTS

CN 2874938 2/2007

(Continued)

OTHER PUBLICATIONS

"Ofice Action of Taiwanese counterpart application ", issued on Jun. 30, 2009, p. 1-p. 5.

(Continued)

Primary Examiner — Minh D Dao
(74) Attorney, Agent, or Firm — Jianq Chyun IP Office (57) ABSTRACT

A foldable electronic device including a first frame, a second frame, a first connecting rod, and a second connecting rod is provided. The first connecting rod has a first end and a second end, wherein the first end and the second end are respectively pivoted on one side of the first frame and the second frame. The second connecting rod has a third end and a fourth end, wherein the third end and the fourth end are respectively pivoted on the other side of the first frame and the second frame. The first connecting rod is suitable for rotating along a first axle, and the second connecting rod is suitable for rotating along a second axle, wherein the first axle is not coaxial with the second axle.

8 Claims, 7 Drawing Sheets

U.S. PATENT DOCUMENTS

| | | | |
|---|---|---|---|
| 7,377,012 B2 * | 5/2008 | Lu | 16/342 |
| 7,519,404 B2 * | 4/2009 | Lonka et al. | 455/575.4 |
| 7,546,150 B2 * | 6/2009 | Makino | 455/575.1 |
| 7,558,057 B1 * | 7/2009 | Naksen et al. | 361/679.56 |
| 7,565,184 B2 * | 7/2009 | Lee et al. | 455/575.1 |
| 7,567,829 B2 * | 7/2009 | Lai et al. | 455/575.3 |
| 7,714,801 B2 * | 5/2010 | Kimmel | 345/1.3 |
| 7,725,123 B2 * | 5/2010 | Takebe | 455/550.1 |
| 7,792,319 B2 * | 9/2010 | Kimura et al. | 381/431 |
| 2002/0077161 A1 | 6/2002 | Eromaki | |
| 2005/0091431 A1 * | 4/2005 | Olodort et al. | 710/72 |
| 2006/0140438 A1 * | 6/2006 | Kimura et al. | 381/431 |
| 2006/0256958 A1 | 11/2006 | Duan et al. | |
| 2006/0265839 A1 * | 11/2006 | Lu | 16/342 |
| 2006/0279925 A1 | 12/2006 | Shi et al. | |
| 2007/0010299 A1 * | 1/2007 | Lai et al. | 455/575.3 |
| 2007/0060216 A1 * | 3/2007 | Huang et al. | 455/575.3 |
| 2010/0041439 A1 * | 2/2010 | Bullister | 455/566 |
| 2010/0085689 A1 * | 4/2010 | Furumatsu et al. | 361/679.01 |
| 2010/0091178 A1 * | 4/2010 | Eromaki et al. | 348/373 |

FOREIGN PATENT DOCUMENTS

TW        I240534        9/2005

OTHER PUBLICATIONS

"1st Office Action of China counterpart application", issued on Nov. 27, 2009, p. 1-p. 6.

* cited by examiner

FOLDABLE ELECTRONIC DEVICE

CROSS-REFERENCE TO RELATED APPLICATION

This application claims the priority benefit of Taiwan application serial no. 96130463, filed on Aug. 17, 2007. The entirety of the above-mentioned patent application is hereby incorporated by reference herein and made a part of specification.

BACKGROUND OF THE INVENTION

1. Field of the Invention

The present invention relates to a foldable electronic device, and more particularly to a foldable electronic device using a four shaft linkage mechanism.

2. Description of Related Art

Handheld electronic devices, such as mobile phones and personal digital assistants (PDA), have become one of the most indispensable equipments in our daily life due to their convenience and portability. In order to protect the keypad or screen of a mobile phone, a lifting cover design or even a sliding cover design is provided to replace the conventional leather casing used for covering the mobile phone. A user will not dial out or damage the keypad accidentally by the foregoing lifting cover or sliding cover.

Figure 1A:
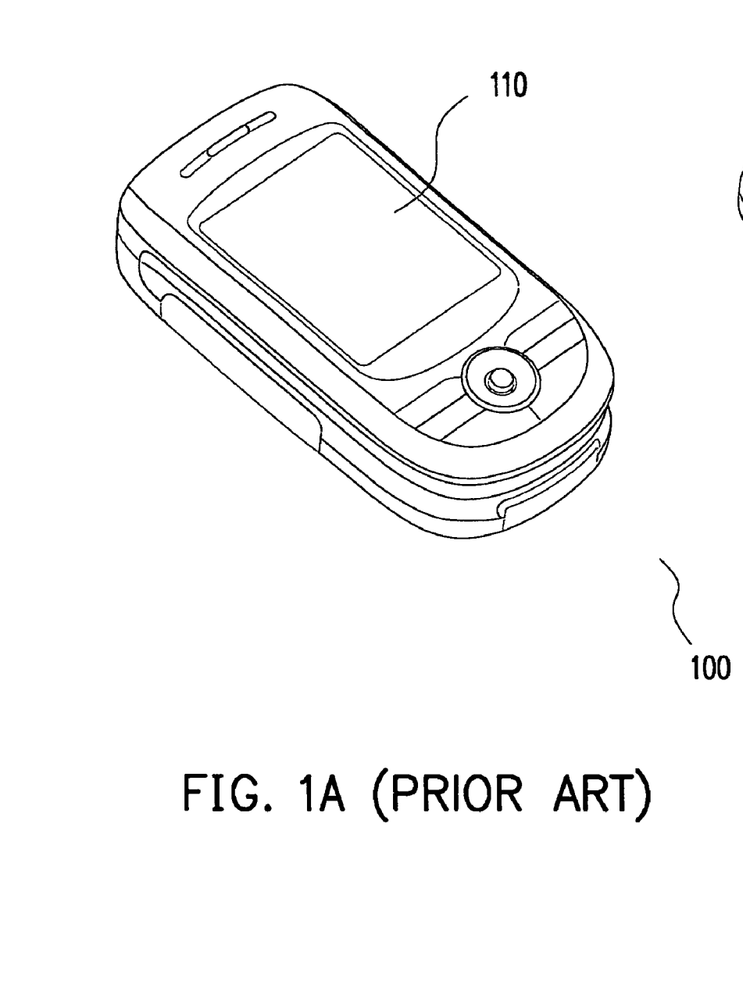
FIG. 1A and FIG. 1B are diagrams of the mobile phone with a conventional sliding cover design, wherein the mobile phone is respectively open and closed.
Figure 1B:
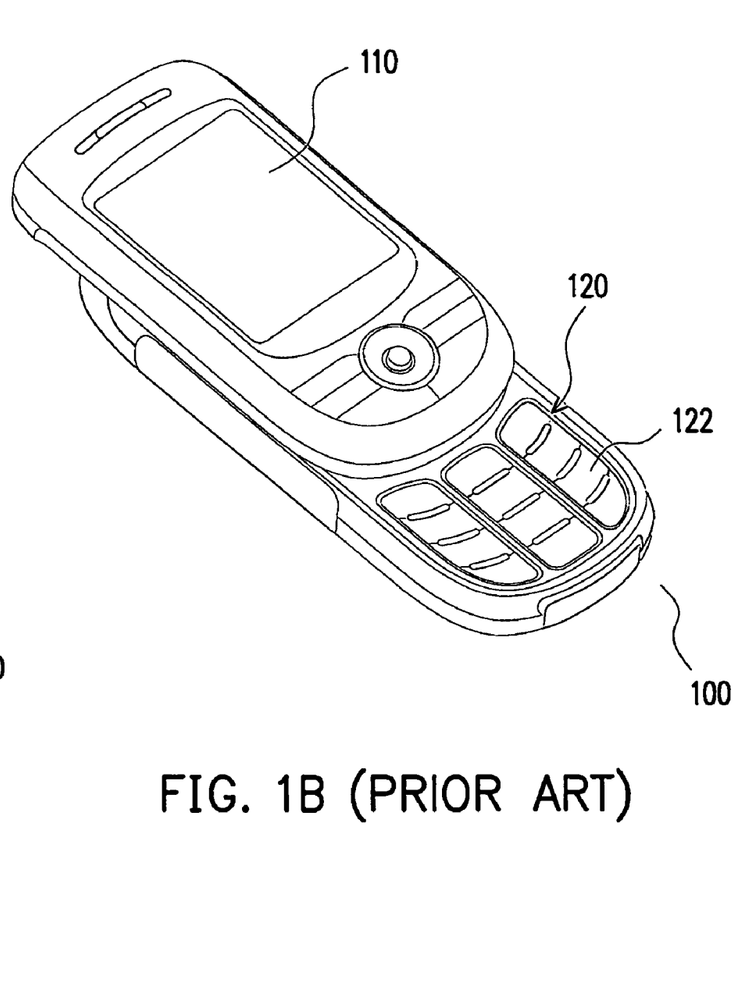

FIG. 1A and FIG. 1B are diagrams of a mobile phone with the conventional sliding cover design, wherein the mobile phone is respectively open and closed. Referring to FIG. 1A and FIG. 1B, a single screen 110 is used when the mobile phone 100 is either open or closed. Using the single screen 110 helps to reduce the fabrication cost of the mobile phone 100. However, the keypad area 120 of the mobile phone 100 is small because that the space is occupied by the sliding mechanism when the screen moves relatively to the keypad. Accordingly, each key 122 has a small size, and it is very inconvenient for a user to operate the mobile phone 100 by the keys 122.

Figure 2A:
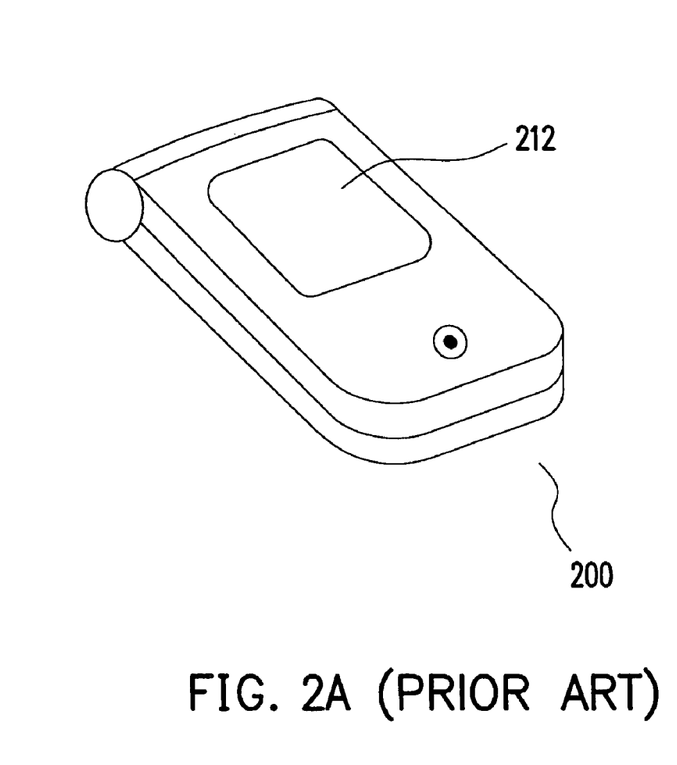
FIG. 2A and FIG. 2B are diagrams of the conventional mobile phone with the lifting cover design, wherein the mobile phone is respectively open and closed.
Figure 2B:
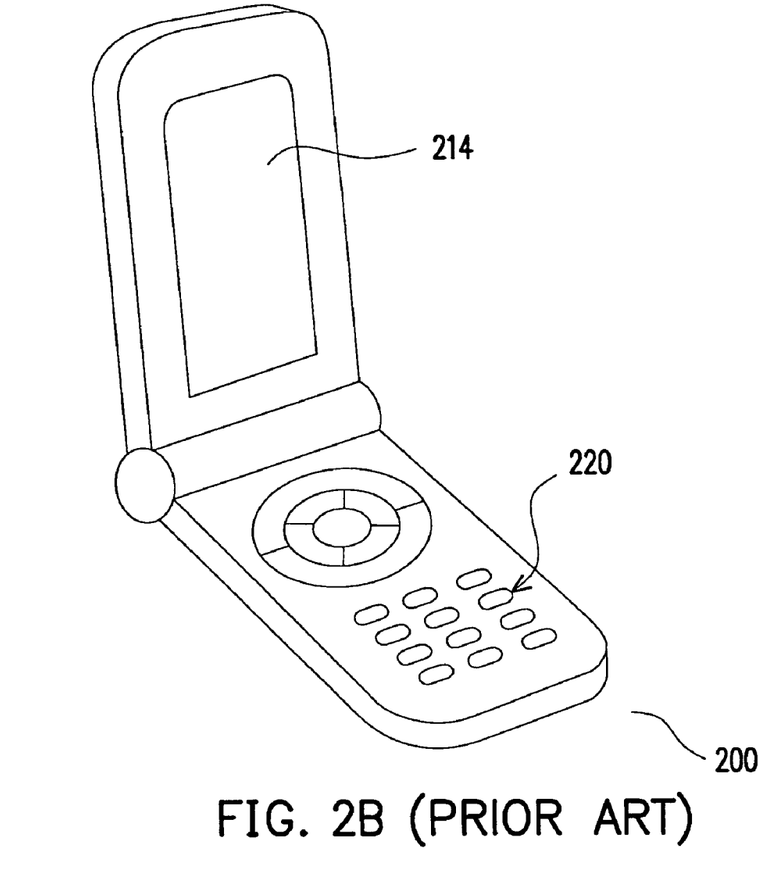

FIG. 2A and FIG. 2B are diagrams of a conventional mobile phone with the lifting cover design, wherein the mobile phone is respectively open and closed. Referring to FIG. 2A and FIG. 2B, the mobile phone 200 has a larger keypad area 220. However, two screens 212 and 214 are disposed inside and outside of the mobile phone 200 for convenient operation, so that a user can know whether there is any missed call or newly received message when the mobile phone 200 is closed. Such a double-screen design increases the thickness and the manufacturing cost of the mobile phone 200.

SUMMARY OF THE INVENTION

Accordingly, the present invention is directed to a foldable electronic device based on a four shaft linkage mechanism, wherein two connecting rods are respectively pivoted on each side of a first frame and a second frame so that the movement of the first frame is restricted by the action tracks of the two connecting rods and accordingly a screen of the foldable electronic device always faces a user when the user is opening the foldable electronic device. Thereby, the foldable electronic device in the present invention has both advantages of a large keypad area for convenient operation and a single screen for cost down.

The present invention provides a foldable electronic device including a first frame, a second frame, a first connecting rod, and a second connecting rod. The first connecting rod has a first end and a second end, wherein the first end and the second end are respectively pivoted on one side of the first frame and the second frame. The second end is pivoted on the second frame with a first axle, and the first connecting rod is capable of rotating along the first axle. The second connecting rod has a third end and a fourth end, wherein the third end and the fourth end are respectively pivoted on the other side of the first frame and the second frame. The fourth end is pivoted on the second frame with a second axle, and the second connecting rod is capable of rotating along the second axle. The first axle is not coaxial with the second axle.

According to an embodiment of the present invention, the first frame, the second frame, the first connecting rod, and the second connecting rod form a four shaft linkage mechanism.

According to an embodiment of the present invention, the first end of the first connecting rod is not coaxial with the third end of the second connecting rod.

According to an embodiment of the present invention, the second frame further includes a blocking element, wherein the blocking element is suitable for supporting the first frame when the first frame is opened relatively to the second frame.

According to an embodiment of the present invention, the foldable electronic device further includes an elastic hinge disposed at a position where the first connecting rod is pivoted on the second frame.

According to an embodiment of the present invention, the foldable electronic device further includes an elastic hinge disposed at a position where the second connecting rod is pivoted on the second frame.

According to an embodiment of the present invention, the first frame includes a display.

According to an embodiment of the present invention, the second frame includes a keypad area.

According to the foldable electronic device provided of the present invention, two connecting rods are respectively pivoted on each side of the first frame and the second frame so as to form a four shaft linkage mechanism, and the two connecting rods are asymmetrical. When the first frame is opened relatively to the second frame, the movement of the first frame is restricted by the action tracks of the two connecting rods. As a result, a screen of the foldable electronic device always faces a user when the user is opening the foldable electronic device. Thereby, the foldable electronic device in the present invention has both advantages of a large keypad area for convenient operation and a single screen for cost down.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3A:
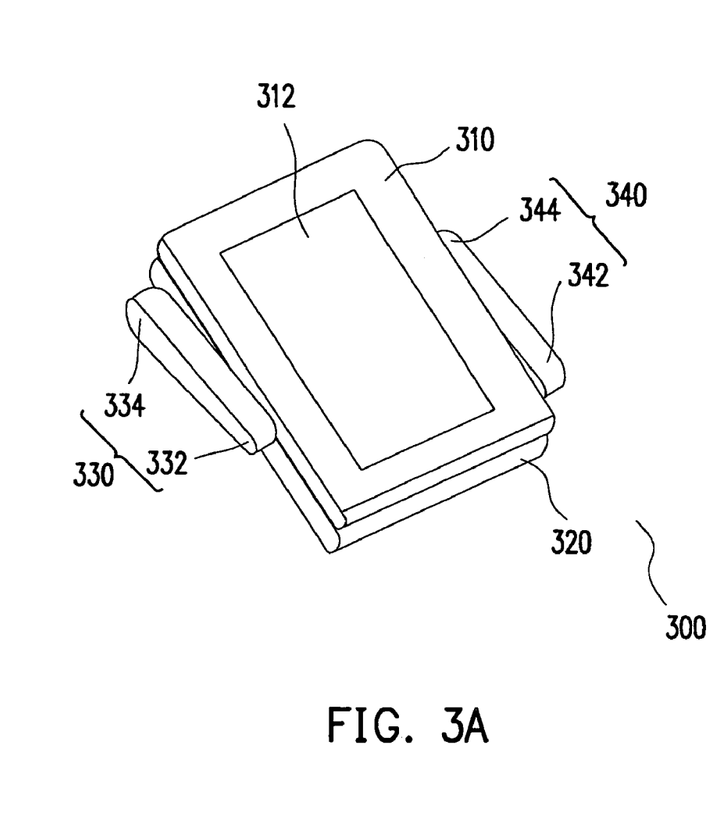
FIG. 3A and FIG. 3B are perspective views of a foldable electronic device according to an embodiment of the present invention, wherein the foldable electronic device is respectively closed and open.
Figure 3B:
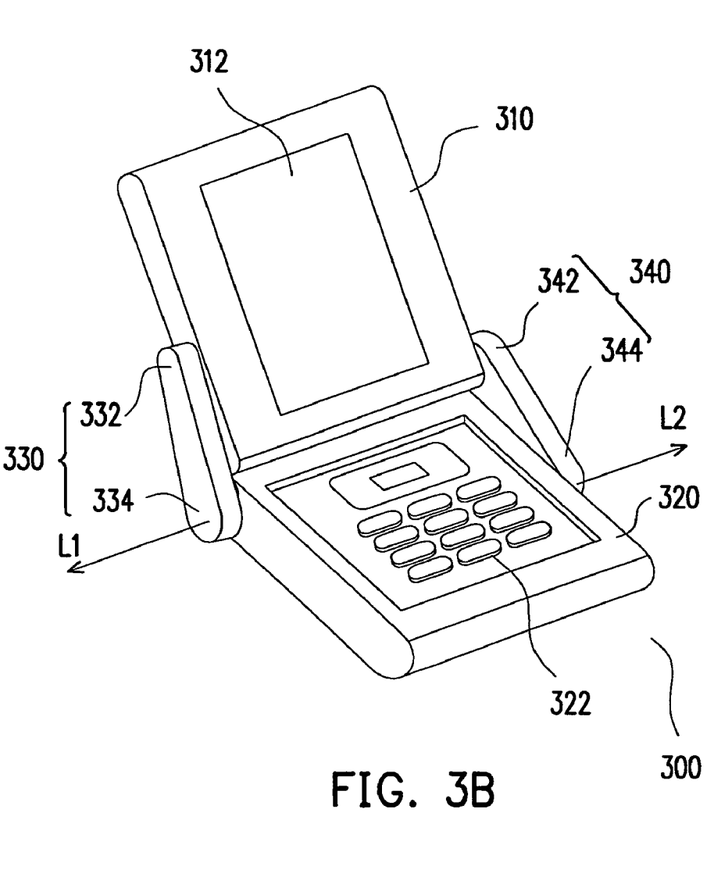

A mobile phone is taken as an example in following embodiments for describing a foldable electronic device provided of the present invention. However, the scope of the foldable electronic device is not limited in the present invention. The foldable electronic device may also be a palmtops, an ultra mobile personal computer (UMPC), a personal digital assistant (PDA), or a translator, etc. FIG. 3A and FIG. 3B are perspective views of a foldable electronic device according to an embodiment of the present invention, wherein the foldable electronic device is respectively closed and open. Referring to both FIG. 3A and FIG. 3B, the foldable electronic device 300 includes a first frame 310, a second frame 320, a first connecting rod 330, and a second connecting rod 340.

A display 312 is disposed on the first frame 310. A main unit is disposed in the second frame 320, and the second frame 320 has a keypad area 322. The main unit is a major element of the entire foldable electronic device 300 for processing electronic data. For example, all the electronic data is processed and calculated by the main unit when a user dials a phone number, types a short message or executes certain functions of the mobile phone. The keypad area 322 allows the user to input phone numbers, short messages or execute certain functions. The electronic data processed and calculated by the main unit is displayed by the display 312 of the first frame 310 so that the user can understand the outcome of the function the user had executed.

The first connecting rod 330 and the second connecting rod 340 respectively connect each side of the first frame 310 and the second frame 320. The first connecting rod 330 has a first end 332 and a second end 334. The first end 332 and the second end 334 are respectively pivoted on the left side of the first frame 310 and the left side of the second frame 320, and the second end 334 is pivoted on the second frame 320 with a first axle L1. The second connecting rod 340 has a third end 342 and a fourth end 344. The third end 342 and the fourth end 344 are respectively pivoted on the right side of the first frame 310 and the right side of the second frame 320, and the fourth end 344 is pivoted on the second frame 320 with a second axle L2. Accordingly, the first frame 310, the second frame 320, the first connecting rod 330, and the second connecting rod 340 form a four shaft linkage mechanism. The first end 332 and the third end 342 are not coaxial, and the second end 334 and the fourth end 344 are not coaxial, namely, the first connecting rod 330 and the second connecting rod 340 are asymmetrical. The first connecting rod 330 and the second connecting rod 340 respectively rotate along the first axle L1 and the second axle L2 as shown in FIG. 3B and accordingly drive the first frame 310 to open or close relatively to the second frame 320.

Figure 4A:
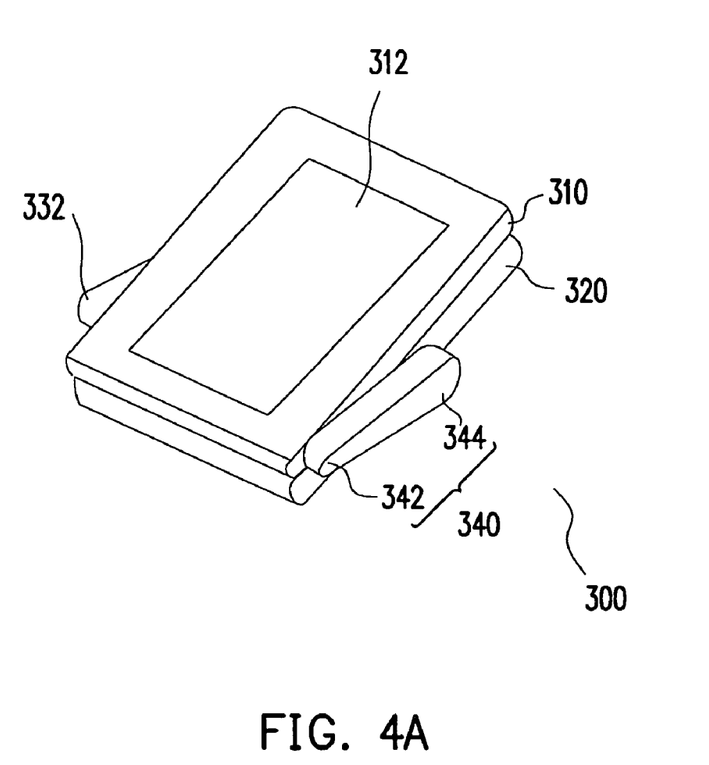
FIGS. 4A~4D are perspective views of the foldable electronic device in the present invention, which the foldable electronic device changes from a closed state to a fully open state.
Figure 4B:
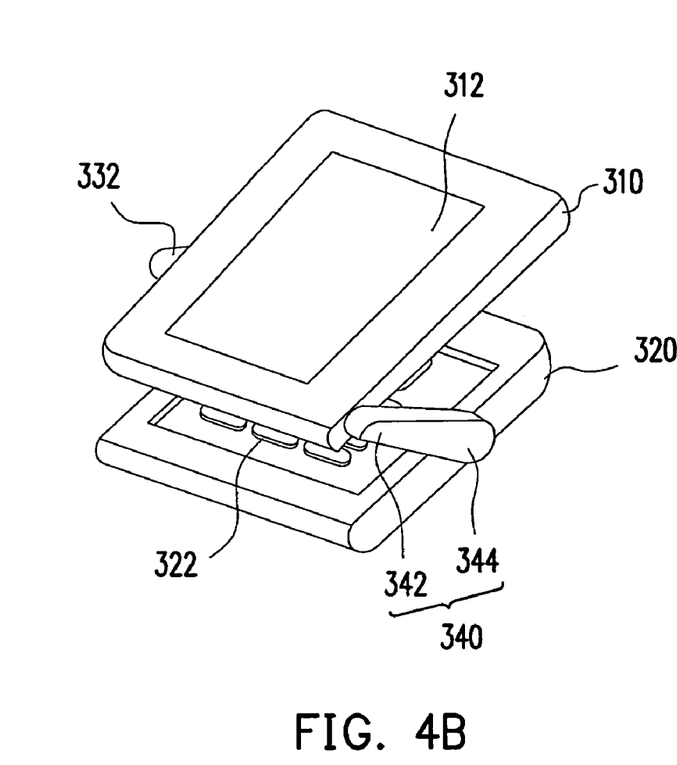
Figure 4C:
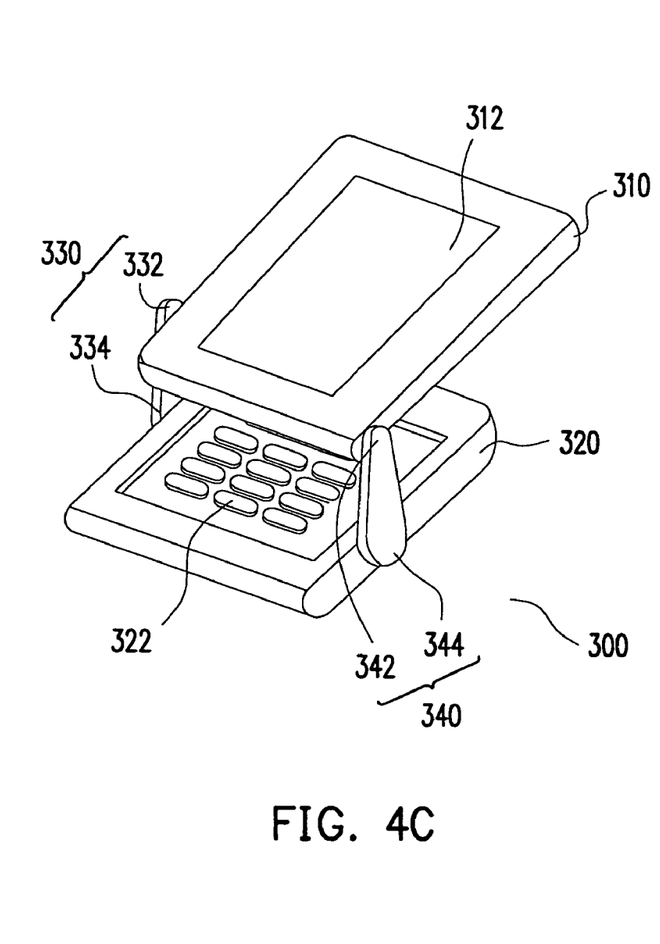
Figure 4D:
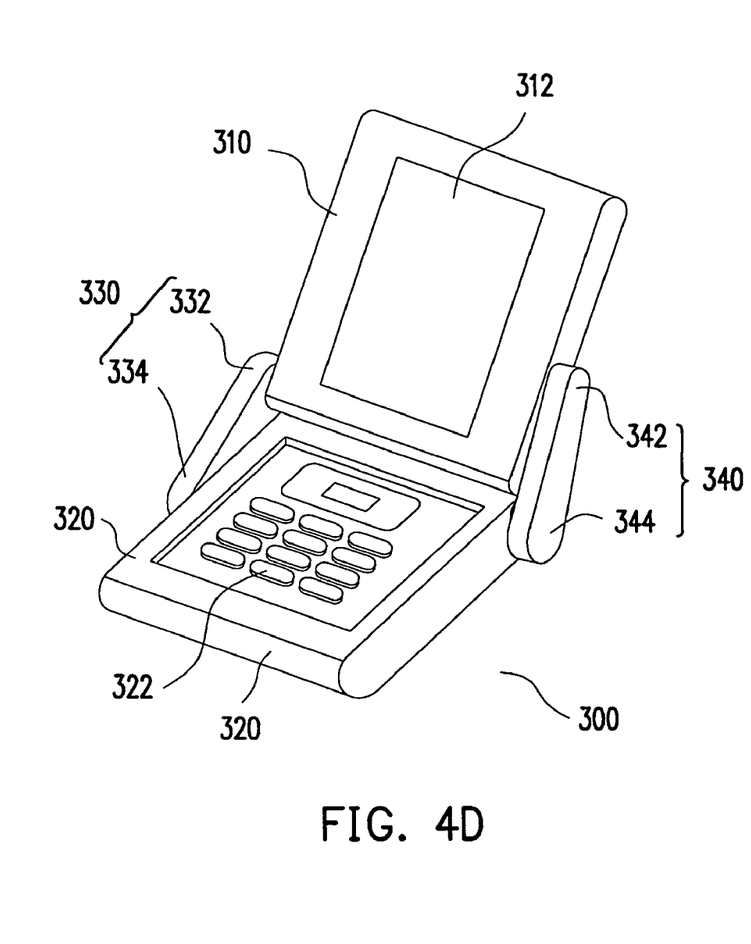
Figure 5:
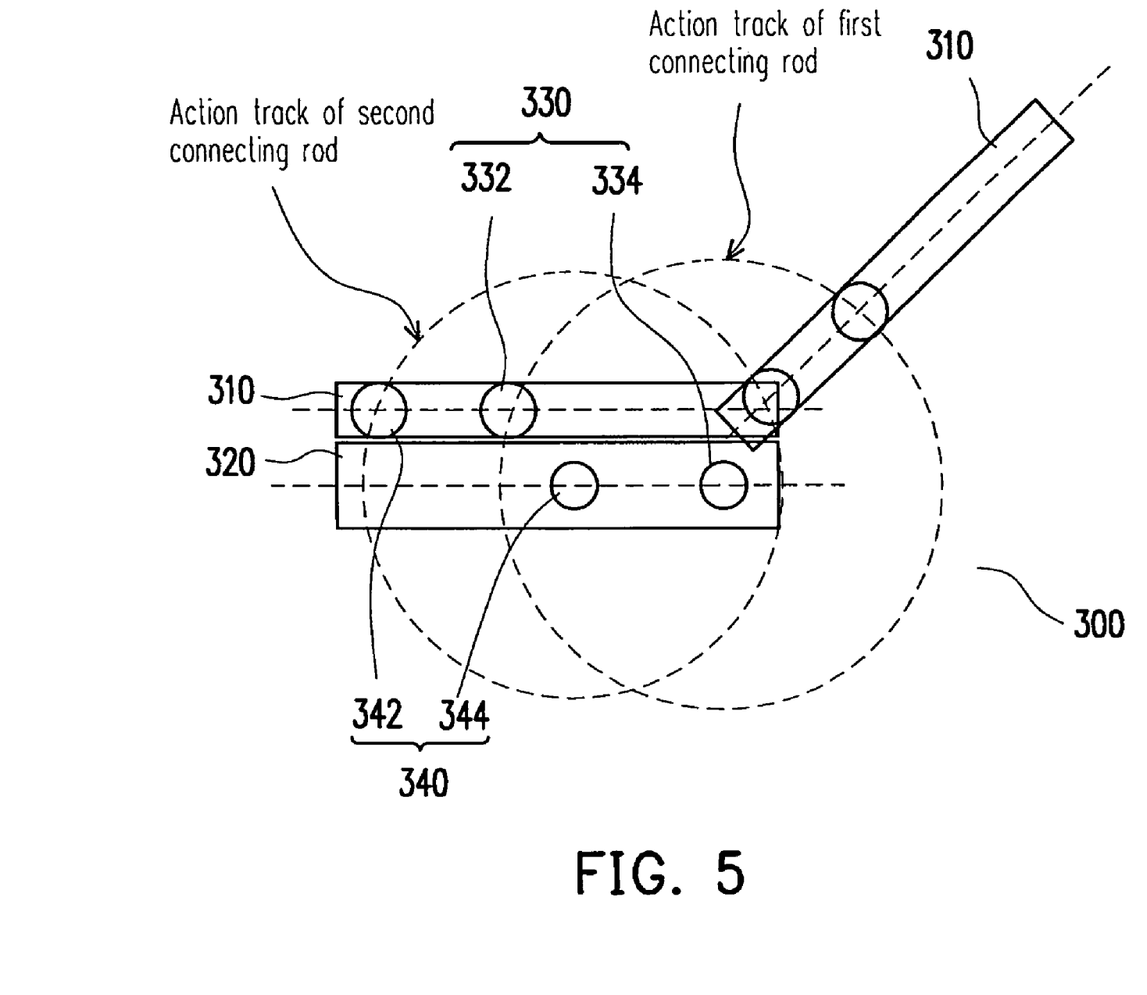
FIG. 5 illustrates the action track of the first connecting rod and the second connecting rod of the foldable electronic device in FIGS. 4A~4D when the first frame of the foldable electronic device is opened relatively to the second frame thereof.

FIGS. 4A~4D are perspective views of the foldable electronic device in the present invention, which the foldable electronic device changes from a closed state to a fully open state. FIG. 5 illustrates the action tracks of the first connecting rod and the second connecting rod of the foldable electronic device in FIGS. 4A~4D when the first frame of the foldable electronic device is opened relatively to the second frame thereof. Referring to FIGS. 4A~4D and FIG. 5, the movement of the first frame 310 is restricted by the action tracks of the first connecting rod 330 and the second connecting rod 340 when the first frame 310 is opened relatively to the second frame 320. As shown in FIG. 4B, the first frame 310 moves upwards horizontally. As shown in FIG. 4C, the first connecting rod 330 and the second connecting rod 340 rotate backwards and accordingly drive the first frame 310 to move backwards. Finally, the first frame 310 reaches the position as shown in FIG. 4D. The positions of the four ends pivoted on the first frame 310 and the second frame 320 and lengths of the first connecting rod 330 and the second connecting rod 340 influence the final position of first frame 310 when the foldable electronic device 300 is open. As shown in FIGS. 4A~4D, the display 312 of the foldable electronic device 300 always faces the user when the user shifts the first frame 310 relatively to the second frame 320. Accordingly, the foldable electronic device 300 have both advantages of a single screen for cost down and a large keypad area for convenient operation compared with the conventional mobile phone.

Figure 6:
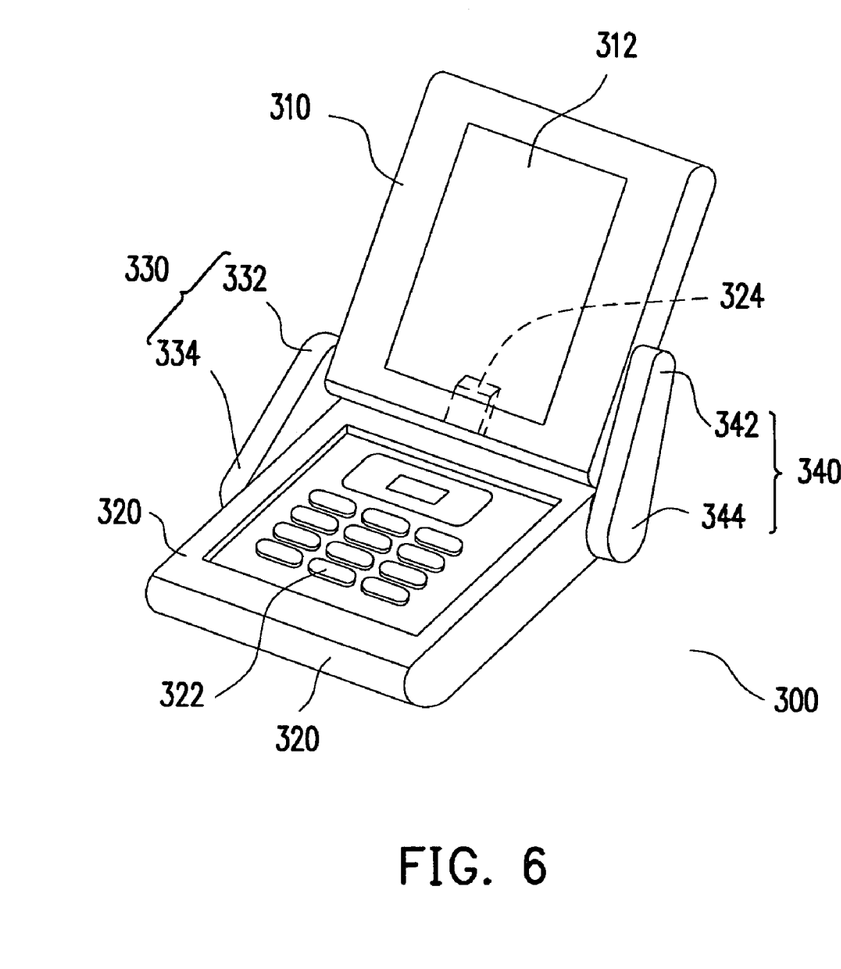
FIG. 6 is a perspective view of the foldable electronic device in the present invention, wherein a blocking element is disposed on the second frame of the foldable electronic device.

In addition, as shown in FIG. 6, a blocking element 324 may be selectively disposed on the second frame 320 such that the blocking element 324 can support the first frame 310 when the first frame 310 reaches the final position as shown in FIG. 4D. Besides, an elastic hinge may be selectively disposed at the position where the first connecting rod 330 is pivoted on the second frame 320 and/or where the second connecting rod 340 is pivoted on the second frame 320. The first frame 310 can be shifted to the final position as shown in FIG. 4D or descended to an original position as shown in FIG. 4A by the elasticity supplied by the elastic hinge when the user shifts or descends the first frame 310 to a predetermined position.

As described above, in the foldable electronic device provided by the present invention, the two connecting rods rotated along two uncoaxial axels are respectively pivoted on each side of the first frame and the second frame to form the four shaft linkage mechanism. The movement of the first frame is restricted by the action tracks of the two connecting rods when the first frame is opened relatively to the second frame, so that a screen of the foldable electronic device always faces the user when the user shifts the first frame relatively to the second frame. Thereby, the foldable electronic device in the present invention has both advantages of a large keypad area for convenient operation and the single screen for cost down.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A foldable electronic device, comprising:
   a first frame
   a second frame;
   a first connecting rod, having a first end and a second end, wherein the first end and the second end are respectively pivoted on one side of the first frame and the second frame, the second end is pivoted on the second frame with a first axle, and the first connecting rod is suitable for rotating along the first axle; and a second connecting rod, having a third end and a fourth end, wherein the third end and the fourth end are respectively pivoted on the other side of the first frame and the second frame, the fourth end is pivoted on the second frame with a second axle, the second connecting rod is suitable for rotating along the second axle, and the first axle is not coaxial with the second axle.

2. The foldable electronic device according to claim 1, wherein the first frame, the second frame, the first connecting rod, and the second connecting rod form a four shaft linkage mechanism.

3. The foldable electronic device according to claim 1, wherein the first end is not coaxial with the third end.

4. The foldable electronic device according to claim 1, wherein the second frame further comprises a blocking element, and the blocking element is suitable for supporting the first frame when the first frame is opened relatively to the second frame.

5. The foldable electronic device according to claim 1 further comprising an elastic hinge disposed at a position where the first connecting rod is pivoted on the second frame.

6. The foldable electronic device according to claim 1 further comprising an elastic hinge disposed at a position where the second connecting rod is pivoted on the second frame.

7. The foldable electronic device according to claim 1, wherein the first frame comprises a display.

8. The foldable electronic device according to claim 1, wherein the second frame comprises a keypad area.

* * * * *